US008503758B2

(12) United States Patent
Naruse

(10) Patent No.: US 8,503,758 B2
(45) Date of Patent: Aug. 6, 2013

(54) IMAGE MEASUREMENT DEVICE, METHOD FOR IMAGE MEASUREMENT, AND COMPUTER READABLE MEDIUM STORING A PROGRAM FOR IMAGE MEASUREMENT

(75) Inventor: Takashi Naruse, Osaka (JP)

(73) Assignee: Keyence Corporation, Osaka (JP)

( * ) Notice: Subject to any disclaimer, the term of this patent is extended or adjusted under 35 U.S.C. 154(b) by 180 days.

(21) Appl. No.: 13/182,539

(22) Filed: Jul. 14, 2011

(65) Prior Publication Data
US 2012/0027307 A1  Feb. 2, 2012

(30) Foreign Application Priority Data
Jul. 29, 2010  (JP) ................................. 2010-170711

(51) Int. Cl.
*G06K 9/00*  (2006.01)
(52) U.S. Cl.
USPC ........................................................ 382/152
(58) Field of Classification Search
None
See application file for complete search history.

(56) References Cited

U.S. PATENT DOCUMENTS

| | | | | |
|---|---|---|---|---|
| 4,648,053 A * | 3/1987 | Fridge | ........................... | 382/147 |
| 5,046,109 A * | 9/1991 | Fujimori et al. | ............. | 382/144 |
| 5,515,159 A * | 5/1996 | Sites et al. | ................. | 356/237.1 |
| 5,930,406 A * | 7/1999 | Itsuzaki et al. | ................ | 382/291 |
| 5,974,169 A * | 10/1999 | Bachelder | ..................... | 382/151 |
| 6,963,338 B1 * | 11/2005 | Bachelder et al. | ............ | 345/420 |
| 7,177,459 B1 * | 2/2007 | Watanabe et al. | ............. | 382/151 |
| 7,209,575 B2 * | 4/2007 | Spaeth | ......................... | 382/103 |
| 7,388,978 B2 * | 6/2008 | Duvdevani et al. | ........... | 382/145 |
| 7,580,560 B2 * | 8/2009 | Bryll | ............................. | 382/152 |
| 7,627,162 B2 * | 12/2009 | Blanford et al. | .............. | 382/141 |
| 7,832,181 B2 * | 11/2010 | Schroeder et al. | ................ | 53/53 |
| 7,957,583 B2 * | 6/2011 | Boca et al. | ..................... | 382/154 |
| 8,103,085 B1 * | 1/2012 | Zadeh | .......................... | 382/141 |
| 2004/0008877 A1 * | 1/2004 | Leppard et al. | ............... | 382/141 |
| 2005/0002555 A1 * | 1/2005 | Kumiya et al. | ............... | 382/153 |
| 2005/0109959 A1 * | 5/2005 | Wasserman et al. | ...... | 250/559.19 |
| 2006/0171580 A1 * | 8/2006 | Blanford et al. | ............. | 382/141 |
| 2008/0130982 A1 * | 6/2008 | Kitamura et al. | ............. | 382/144 |
| 2009/0033655 A1 * | 2/2009 | Boca et al. | .................... | 345/419 |

FOREIGN PATENT DOCUMENTS

| | | |
|---|---|---|
| JP | 2009-300124 | 12/2009 |
| JP | 2009-300125 | 12/2009 |
| JP | 2010-019667 | 1/2010 |
| JP | 2010-032329 | 2/2010 |
| JP | 2010-032330 | 2/2010 |

(Continued)

*Primary Examiner* — Stephen R Koziol
*Assistant Examiner* — Sean Conner
(74) *Attorney, Agent, or Firm* — Kilyk & Bowersox, P.L.L.C.

(57) ABSTRACT

An image measurement device capable of recognizing a relative position and easily identifying a measurement result is provided, the device including: a measurement configuration data storage section that holds characteristic amount information, information for portions to be measured, and setting value information; a placement state detection section that detects a position and a posture of each workpiece; an edge detection section that detects an edge of portions to be measured; a pass-fail determination section that calculates size values of the portions to be measured and performs pass-fail determination of the portions to be measured and the workpiece; a measurement result display section that displays a result of the pass-fail determination of the workpiece over the workpiece image; and a workpiece selection section for selecting any of the workpieces. The measurement result display section displays the result of the pass-fail determination for the portions to be measured of the selected workpiece.

6 Claims, 12 Drawing Sheets

FOREIGN PATENT DOCUMENTS

| | | |
|---|---|---|
| JP | 2010-032331 | 2/2010 |
| JP | 2010-032471 | 2/2010 |
| JP | 2010-060528 | 3/2010 |
| JP | 2010-169584 | 8/2010 |

* cited by examiner

WORKPIECE IMAGE

MASTER IMAGE

CHARACTERISTIC AMOUNTS B1

CHARACTERISTIC AMOUNTS B2

IMAGE MEASUREMENT DEVICE, METHOD FOR IMAGE MEASUREMENT, AND COMPUTER READABLE MEDIUM STORING A PROGRAM FOR IMAGE MEASUREMENT

CROSS-REFERENCE TO RELATED APPLICATIONS

The present application claims foreign priority based on Japanese Patent Application No. 2010-170711, filed Jul. 29, 2010, the contents of which is incorporated herein by reference.

BACKGROUND OF THE INVENTION

1. Field of the Invention

The present invention relates to an image measurement device, a method for image measurement, and a computer readable medium storing a program for an image measurement device. Particularly, the present invention relates to an improvement of the image measurement device for measuring the size of the workpiece by detecting edges within the workpiece image obtained thereby.

2. Description of the Related Art

Generally, the image measurement device is a device for measuring the size of the workpiece based on the edge position of the workpiece image (Japanese patent publication No. 2009-300124, No. 2009-300125, No. 2010-019667). As usual, the workpiece is placed on a movable stage which can be moved in X-axis, Y-axis and Z-axis directions. It is possible to focus the workiece image by moving the movable stage in the Z-axis direction and adjust the position within a view of the image measurement device by moving the movable stage in the X-axis and Y-axis directions.

Since the workpiece image is strictly similar figure to the workpiece regardless of the position of the movable stage in the z-axis direction, it is possible to detect the actual size of the workpiece by measuring a distance from or an angle of the workpiece image. However, in the conventional image measurement device, it is hard to recognize relative position between the workpieces from the workpiece image for plurality of the workpieces placed on the movable stage, because visibility under the image measurement device is narrow. Therefore, there is a difficulty for an user to identify which workpiece a measurement result of the workpiece image have been measured from. Accordingly, it may be considered to display the measurement results along with each of the workpiece image over the plurality of the workpiece images in a wide field of view at a low magnification. However, if the measured sizes are displayed, it becomes difficult for an user to identify the measurement results.

SUMMARY OF THE INVENTION

Present invention provide an image measurement device, a method for image measurement, and a computer readable medium storing a program for an image measurement device identifying relative position for the plurality of the workpieces and the measurement result. Particularly, the embodiments of the present invention provide an image measurement device which can switch to the display state to identify the pass or fail for each workpiece, for the desired workpiece, in which the pass or fail of each portion to be measured can be identified.

According to a first aspect of the present invention, an image measurement device for measuring each sizes of workpieces by obtaining a workpiece image obtained by capturing two or more workpieces and detecting edges in the workpiece image, includes; an measurement configuration data storage section for storing characteristic amount information indicating characteristic amounts for detecting the workpieces from the workpiece image, information for portions to be measured, and setting value information including the design data and tolerances in association with the portions to be measured; a placement state detection section for detecting positions and postures of the workpieces by analyzing the workpiece image using the characteristic amounts; an edge detection section for detecting edges of the portions to be measured from the workpiece image for the workpieces the positions and the postures of which are detected; a pass or fail determination section for calculating the sizes of the portions to be measured based on the detected edges, comparing the sizes with the tolerances, performing a pass or fail determination of the portions to be measured, and performing a pass or fail determination of the workpieces based on the pass or fail determination of the portions to be measured; a measurement result display section for displaying results of the pass or fail determination of the workpieces over the workpiece images;

the workpiece selection section for selecting one of the workpieces, wherein the measurement result display section displays the result of the pass or fail determination of the portions to be measured for the workpiece selected by the workpiece selection section.

According to the first aspect of the present invention, when the measurement result is displayed over the single workpiece image including the plurality of workpieces, the result of the pass or fail determination is displayed. Therefore, as compared to the case in which the size value of each portion to be measured is displayed for each workpiece, it is possible, for the plurality of workpieces, to easily recognize relative positional relation and to easily identify the measurement result in a single workpiece image including the plurality of workpieces. Further, the result of the pass or fail determination of the portion to be measured for the selected workpiece is displayed. Therefore, it is possible to easily recognize the pass or fail determination of each workpiece, for the desired workpiece, in which the pass or fail of each portion to be measured can be identified.

According to a second aspect of the present invention, An image measurement device for measuring each sizes of workpieces by obtaining a workpiece image obtained by capturing two or more workpieces and detecting edges in the workpiece image, includes; an measurement configuration data storage section for storing characteristic amount information including first characteristic amounts for detecting the workpiece from the workpiece image and second characteristic amounts for detecting a determination site including two or more portions to be measured, information for portions to be measured, setting value information including the design data and tolerances in association with the portions to be measured, and determination site information indicating the determination site; a placement state detection section for detecting positions and postures of the workpieces by analyzing the workpiece image using the first characteristic amounts and positions and postures of the determination site using the second characteristic amounts; a pass or fail determination section for calculating the sizes of the portions to be measured based on the detected edges, comparing the sizes with the tolerances, performing a pass or fail determination of the portions to be measured, and performing a pass or fail determination of the determination site and the workpieces based on the pass or fail determination of the portions to be measured; a measurement result display section for displaying results of the pass or fail determination of the workpieces over the workpiece images; the workpiece selection section for selecting one of the workpieces, wherein the measurement result display section displays the result of the pass or fail determination of the determination site for the workpiece selected by the workpiece selection section.

According to the second aspect of the present invention, when the measurement result is displayed over the workpiece image, the result of the pass or fail determination of the workpiece is displayed. Therefore, as compared to the case in which the size value of the each portion to be measured is displayed for each workpiece, it is possible, for the plurality of workpieces, to easily recognize relative positional relation and to easily identify the measurement result. Further, the result of the pass or fail determination of each determination site for the selected workpiece is displayed. Therefore, it is possible, for the desired workpiece, to switch to the display state in which the pass or fail of each portion to be measured can be identified. In addition, for the selected determination site, the result of the portion to be measured is displayed. Therefore, it is possible, for the desired determination site of the desired workpiece, to easily recognize the pass or fail determination of each portion to be measured.

According to a third aspect of the present invention, in addition to the configuration described above, the image measurement device further includes; a determination site selection section for selecting one of the determination sites of the workpiece selected by the workpiece selection section, wherein the measurement result display section displays the result of the pass-fail determination of the portions to be measured for the determination site selected by the determination site selection section.

According to a fourth aspect of the present invention, in addition to the configuration described above, the measurement result display section displays the size in association with the portions to be measured.

According to a fifth aspect of the present invention, an image measurement method for measuring each sizes of workpieces by obtaining a workpiece image obtained by capturing two or more workpieces and detecting edges in the workpiece image includes the steps of storing characteristic amount information indicating characteristic amounts for detecting the workpieces from the workpiece image, information for portions to be measured, and setting value information including the design data and tolerances in association with the portions to be measured; detecting positions and postures of the workpieces by analyzing the workpiece image using the characteristic amounts; detecting edges of the portions to be measured from the workpiece image for the workpieces the positions and the postures of which are detected; calculating the sizes of the portions to be measured based on the detected edges, comparing the sizes with the tolerances and performing a pass-fail determination of the portions to be measured; performing a pass-fail determination of the workpieces based on the pass-fail determination of the portions to be measured; and displaying results of the pass-fail determination of the workpieces over the workpiece image, wherein the pass-fail determination of the portions to be measured for the selected workpiece is displayed when one of the workpieces is selected.

According to a sixth aspect of the present invention, a program for an image measurement device for measuring each sizes of workpieces by obtaining a workpiece image obtained by capturing two or more workpieces and detecting edges in the workpiece image includes; a function of storing characteristic amount information indicating characteristic amounts for detecting the workpieces from the workpiece image, information for portions to be measured, and setting value information including the design data and tolerances in association with the portions to be measured; a function of detecting positions and postures of the workpieces by analyzing the workpiece image using the characteristic amounts; a function of detecting edges of the portions to be measured from the workpiece image for the workpieces the positions and the postures of which are detected; a function of the sizes of the portions to be measured based on the detected edges, comparing the sizes with the tolerances and performing a pass-fail determination of the portions to be measured; a function of performing a pass-fail determination of the workpieces based on the pass-fail determination of the portions to be measured; and a function of displaying results of the pass-fail determination of the workpieces over the workpiece image, wherein the pass-fail determination of the portions to be measured for the selected workpiece is displayed when one of the workpieces is selected.

According to the image measurement device, the method for image measurement, and the program for the image measurement device of the present invention, when the measurement result is displayed over the workpiece image, the result of the pass or fail determination of the workpiece is displayed. Therefore, as compared to the case in which the size value of each portion to be measured for each workpiece is displayed, it is possible, for the plurality of workpieces, to easily recognize relative positional relation and easily identify the measurement result. Especially, since the pass or fail determination of the portion to be measured for the selected workpiece is displayed, for the desired workpiece, it is possible to identify the pass or fail determination of each workpiece and to switch to the display state in which the pass or fail of each portion to be measured can be identified. Further, the result of the pass or fail determination of the determination site for the selected workpiece is displayed. Therefore, it is possible to identify the pass or fail determination of each workpiece and to switch to the display state in which the pass or fail of each determination site can be identified for the desired workpiece.

DETAILED DESCRIPTION OF PREFERRED EMBODIMENTS

First Embodiment

Image Measurement Device

Figure 1:
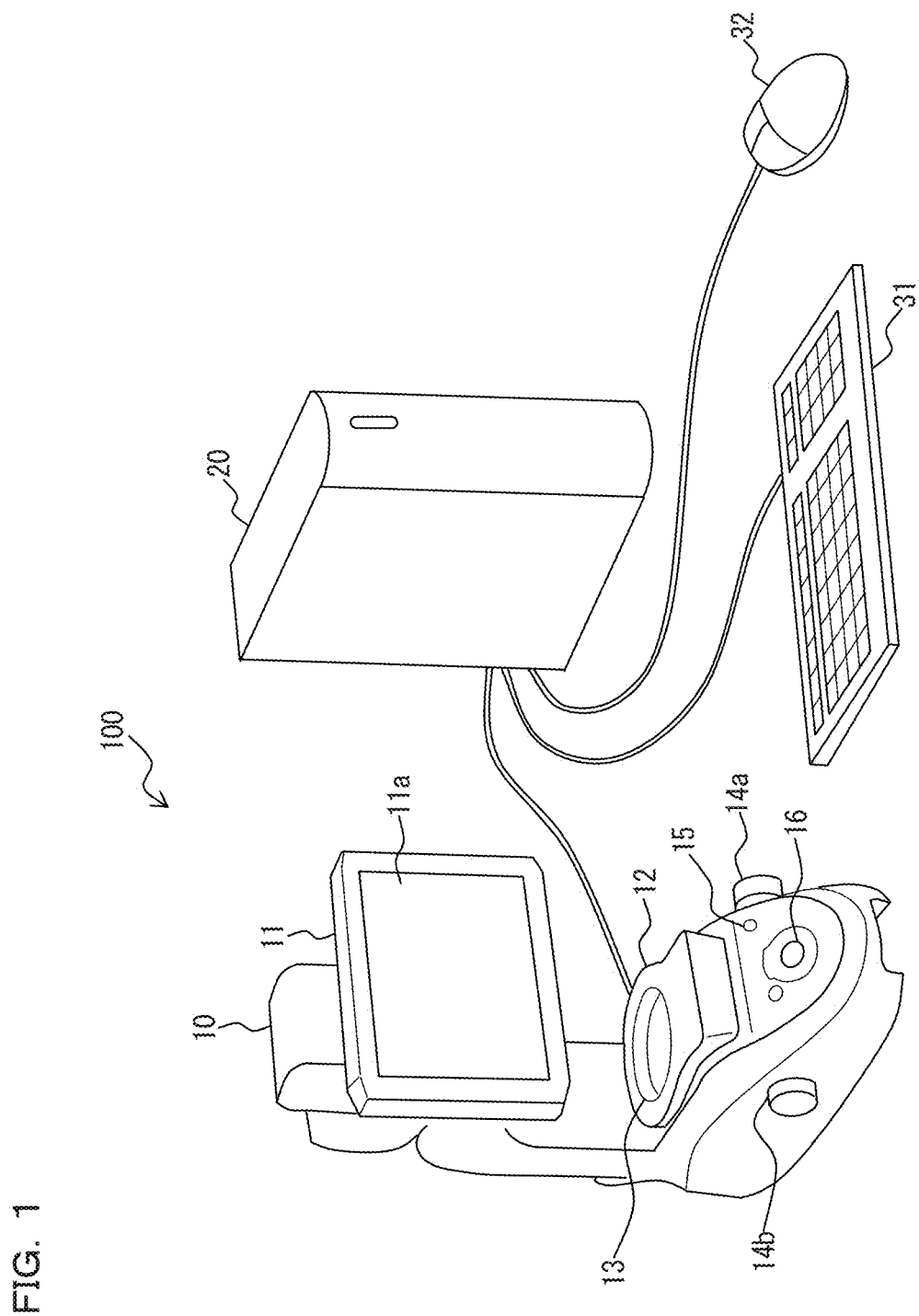
FIG. 1 is a perspective view showing an example of a configuration of an image measurement device 100 according to an embodiment of the present invention.

FIG. 1 is a perspective view showing one example of a configuration of an image measurement device 100 according to a first embodiment of the present invention. The image measurement device 100 is an image measuring instrument configured to pick up images of a plurality of workpieces placed in a detection area 13 on a movable stage 12 at different imaging magnifications and analyze the picked-up images, thereby automatically measuring a size of each workpiece. The image measurement device 100 is provided with a measuring unit 10, a control unit 20, a keyboard 31, and a mouse 32. Each workpiece is an object to be measured whose shape and size are measured.

The measuring unit 10 is an optical unit configured to irradiate each workpiece with detection light, and receives transmitted or reflected light, thereby generating a picked-up image. The measuring unit 10 is provided with a display 11, the movable stage 12, an XY position adjustment knob 14a, a Z position adjustment knob 14b, a power switch 15, and a measurement start switch 16.

The display 11 is a display device configured to display the picked-up image and a measurement result in a display screen 11a. The movable stage 12 is a placement table on which the workpieces as measurement targets are placed, and provided with the detection area 13 through which the detection light is transmitted. The detection area 13 is a circular area configured by transparent glass. The movable stage 12 can be moved in a Z-axis direction that is parallel to a light axis of the detection light as well as in an X-axis direction and a Y-axis direction that are perpendicular to the light axis.

The XY position adjustment knob 14a is an operation section for moving the movable stage 12 in the X-axis direction and the Y-axis direction. The Z position adjustment knob 14b is an operation section for moving the movable stage 12 in the Z-axis direction. The power switch 15 is an operation section for turning on the measuring unit 10 and the control unit 20, and the measurement start switch 16 is an operation section for starting image measurement of the workpieces.

The control unit 20 is a controller configured to control imaging and display on a screen by the measuring unit 10 and analyze the picked-up image, thereby measuring a size of each workpiece. The control unit 20 is connected with the keyboard 31 and the mouse 32. After the power is turned on, placing a plurality of workpieces randomly within the detection area 13 and operating the measurement start switch 16 allow automatic measurement of a size of each workpiece.

Measuring Unit

Figure 2:
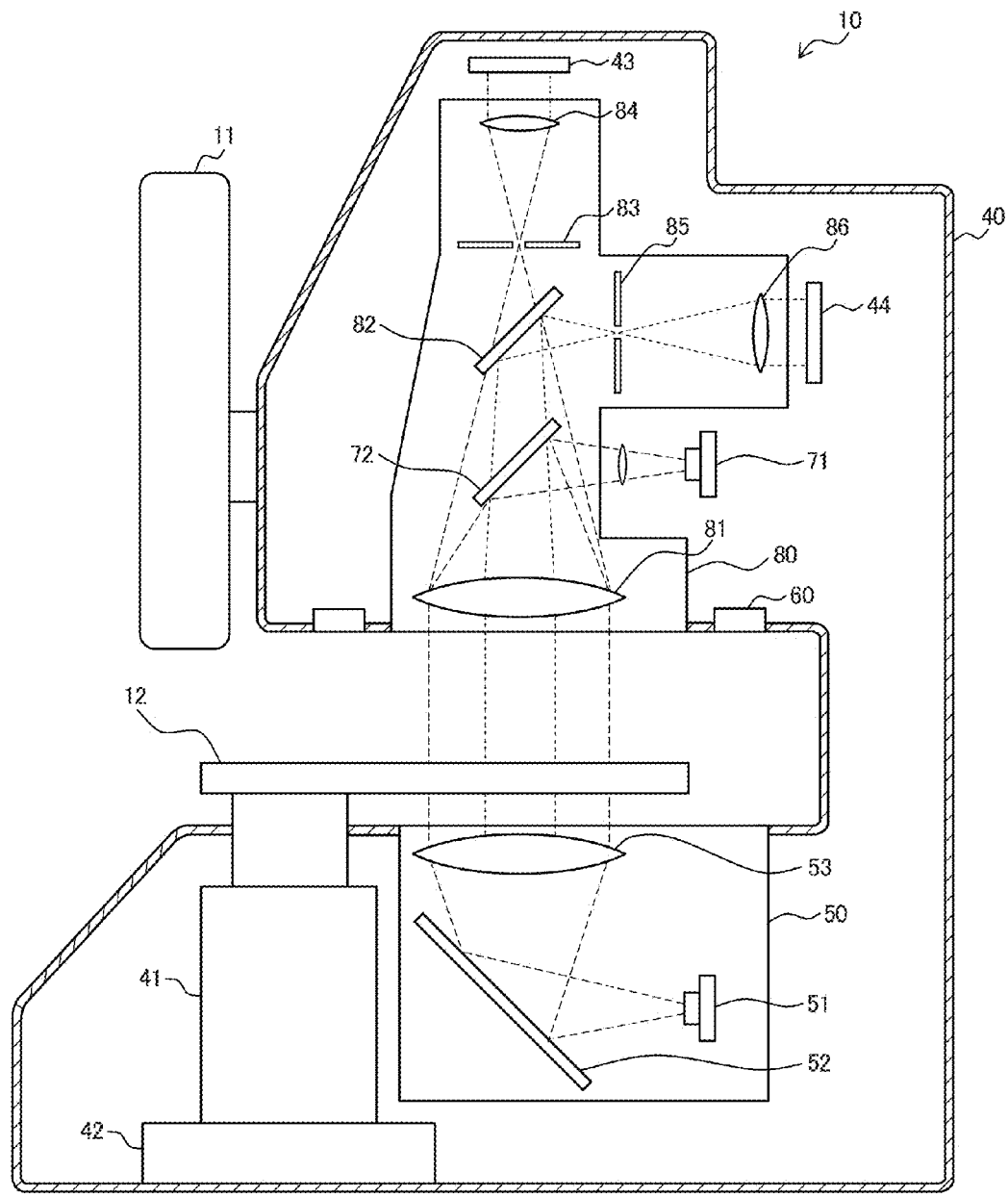
FIG. 2 is an explanatory view schematically showing an example of a configuration of a measuring unit 10 in the image measurement device 100 of FIG. 1, showing a vertical cross-section of the measuring unit 10.

FIG. 2 is an explanatory view schematically showing an example of a configuration of the measuring unit 10 in the image measurement device 100 of FIG. 1, showing a vertical cross-section of the measuring unit 10. Within a casing 40, the measuring unit 10 is provided with a Z drive section 41, an XY drive section 42, an imaging devices 43 and 44, a transmitted illumination unit 50, a ring illumination unit 60, a coaxial epi-illumination light source 71, and a receiver lens unit 80.

The Z drive section 41 is a Z position adjustment unit configured to move, based on a drive signal from the control unit 20, the movable stage 12 in the Z-axis direction and adjust a position of the workpiece in the Z-axis direction. The XY drive section 42 is an XY position adjustment unit configured to move, based on an XY drive signal from the control unit 20, the movable stage 12 in the X-axis direction and in the Y-axis direction and adjust the position of the workpiece within an XY plane.

The transmitted illumination unit 50 is an illuminating device configured to irradiate the workpiece placed on the movable stage 12 with detection light from a bottom side, and configured by a transmitting illumination light source 51, a mirror 52, and an optical lens 53. The detection light emitted from the transmitting illumination light source 51 is reflected on the mirror 52, and exits through the optical lens 53. The detection light is transmitted through the movable stage 12. A part of the transmitting light is shielded by the workpiece and the other part of the transmitting light enters the receiver lens unit 80.

The ring illumination unit 60 is an illuminating device configured to irradiate the workpiece on the movable stage 12 with detection light from a top side, and configured by a ring-shaped light source that surrounds the receiver lens unit 80. The coaxial epi-illumination light source 71 is a light source configured to irradiate the workpiece on the movable stage 12 with detection light from the top side, and provided with a half mirror 72 such that a light axis of the light emitted to the workpiece and a light axis of the light reflected on the workpiece are coaxial. One of the transmitted illumination, the ring illumination, and the coaxial epi-illumination can be selectively used to illuminate the workpiece.

The receiver lens unit 80 is an optical system configured by receiver lenses 81, 84, and 86, a half mirror 82, and throttle plates 83 and 85, and configured to receive light transmitted from the transmitted illumination unit 50 and reflected light of the detection light on the workpiece, thereby causing the imaging devices 43 and 44 to form an image. The receiver lens 81 is an optical lens disposed on a side of the movable stage 12 so as to face toward an upper surface of the movable stage 12. The receiver lens 84 is an optical lens disposed on a side of the imaging device 43 so as to face toward the imaging device 43. Further, the receiver lens 86 is an optical lens disposed on a side of the imaging device 44 so as to face toward the imaging device 44.

The throttle plate 83 and the receiver lens 84 constitute a low-magnification image formation section whose imaging magnification is low, and disposed such that their central axes are aligned with those of the optical lens 53 and the receiver lens 81. By contrast, the throttle plate 85 and the receiver lens 86 constitute a high-magnification image formation section whose imaging magnification is high, and the detection light from the workpiece is incident via the half mirror 82. The receiver lenses 81, 84, and 86 are referred to as a telecentric lens having a characteristic that a size of an image does not change even when the position of the workpiece changes along the light axis direction (Z-axis direction).

The imaging device 43 is a low-magnification image sensor configured to pick up an image of the workpiece within a low-magnification visual field provided by the receiver lens unit 80 at a low magnification to generate a low-magnification image. The imaging device 44 is a high-magnification image sensor configured to pick up an image of the workpiece within a high-magnification visual field provided by the receiver lens unit 80 at a high magnification to generate a high-magnification image. The high-magnification visual field is narrower than the low-magnification visual field and provided within the low-magnification visual field.

Either of the imaging devices 43 and 44 is configured by a semiconductor device such as a charge coupled device (CCD) or a complementary metal oxide semiconductor (CMOS).

According to the image measurement device 100, it is possible to capture the workpiece in the low-magnification visual field as long as the workpiece is placed within the detection area 13 on the movable stage 12. Further, the workpiece placed within the low-magnification visual field is guided to the high-magnification visual field by analyzing the low-magnification image and moving the movable stage 12 within the XY plane, thereby being imaged at a high magnification. In the image measurement device 100, the low-magnification visual field and the high-magnification visual field are substantially concentric, and it is possible to obtain the low-magnification image and the high-magnification image at the same time.

Operation of Image Measurement Device

Figure 3:
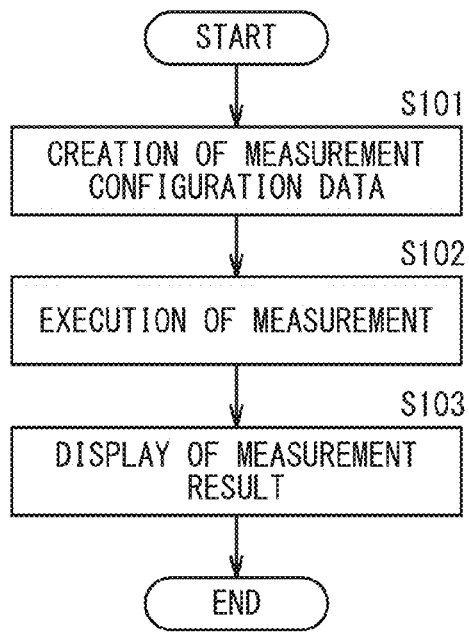
FIG. 3 is a flowchart showing one example of an operation of the image measurement device 100 of FIG. 1.

Steps S101 to S103 in FIG. 3 show a flowchart of one example of an operation of the image measurement device 100 of FIG. 1. The operation of the image measurement device 100 includes three processes, i.e., creation of measurement configuration data (step S101), execution of measurement (step S102), and display of a measurement result (step S103).

The measurement configuration data is information necessary for execution of the measurement, and includes information such as characteristic amount information indicating characteristic amounts, information for portions to be measured indicating portions to be measured and measurement types, and setting value information indicating design values and tolerances for each portion to be measured. The characteristic amount information is information for positioning used to analyze an image of a workpiece and determine a position and a posture of the workpiece, and is set based on predetermined master data. When the characteristic amount information and the information for portions to be measured are set based on a high-magnification image, identification information indicative of this is held as measurement configuration data.

The measurement configuration data is created by the control unit 20. Alternatively, it is possible to use the measurement configuration data created by an information processing terminal such as a personal computer (PC) and transferred to the control unit 20. The measurement process is executed based on such measurement configuration data. Then, the process for displaying a measurement result is performed by displaying values of the size obtained by the measurement on the display 11.

Creation of Measurement Configuration Data

Figure 4:
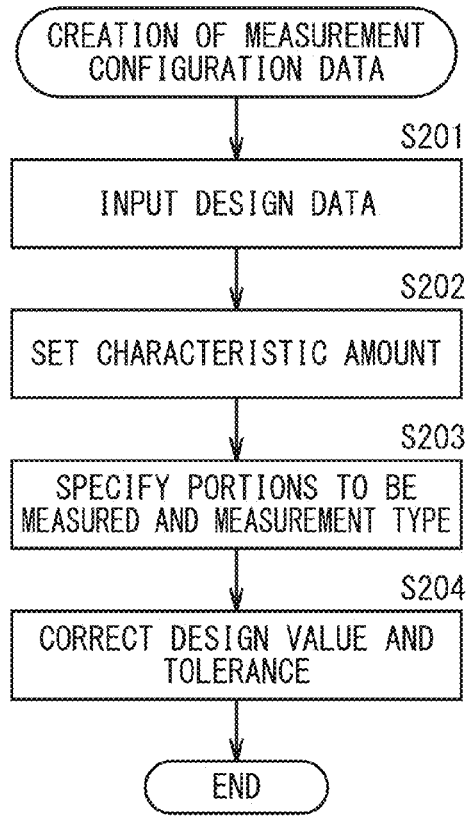
FIG. 4 is a flowchart showing one example of an operation when creating measurement configuration data in the image measurement device 100 of FIG. 1.

Steps S201 to S204 in FIG. 4 show a flowchart of one example of an operation when creating the measurement configuration data in the image measurement device 100 of FIG. 1. The flowchart shows a case in which the control unit 20 creates the measurement configuration data.

The process of creating the measurement configuration data includes four procedures as described below. First, design data is inputted (step S201). In the step of inputting the design data, master data which used for setting of the characteristic amounts and comparison of contours is obtained. The master data is a picked-up image obtained by imaging a predetermined reference object such as the master workpiece, or computer aided design (CAD) data or a CAD image created by CAD. Herein, an example is described in which the master image obtained by imaging the master workpiece is used as the master data.

Next, the characteristic amounts are set (step S202). The characteristic amounts are set by setting the characteristic amount information and a measurement range based on the master image. Then, portions to be measured and a measurement type are specified (step S203). The portions to be measured and the measurement type are specified by specifying an edge detection area and the measurement type for each desired portion to be measured in the master image displayed in the display 11.

The edge detection area is an area in which an edge line is detected by analyzing a brightness change in the area of the picked-up image. The specification of the measurement type is to specify a measurement method as to what to measure. Upon completion of the specification of the portions to be measured and the measurement type, the measurement is executed using the master image. Specifically, the edge line is detected from the master image, and size values are measured for the respective portions to be measured. A result of the measurement of the size values is displayed over the master image, for example.

Next, design values and tolerances are set (step S204). In the setting of the design values and the tolerances, a size value for each displayed portion to be measured is changed as needed and set as the design value. In addition, the tolerances are set in association with the design values. The measurement configuration data thus created is written to a memory within the control unit 10.

Measurement Process

Figure 5:
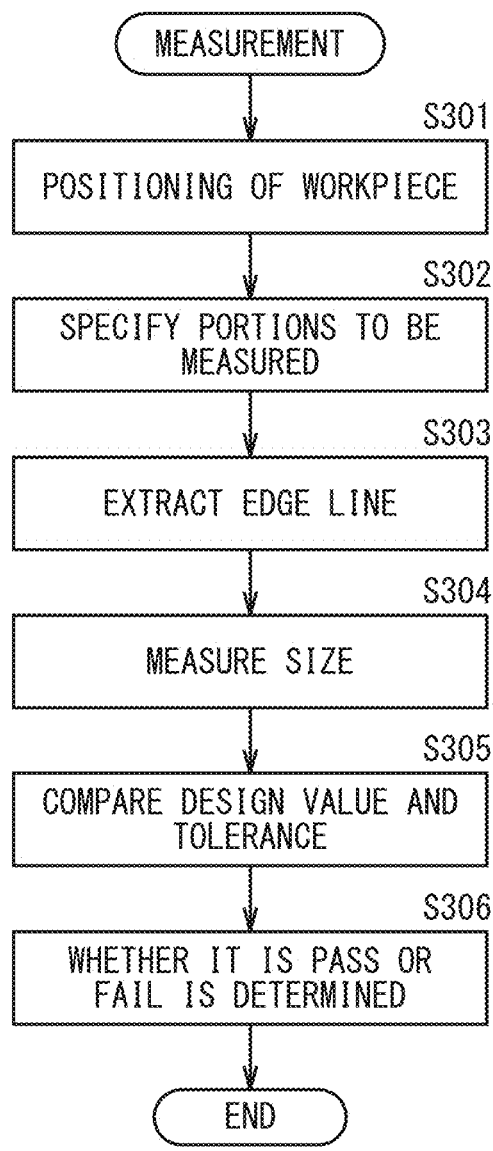
FIG. 5 is a flowchart showing one example of an operation during measurement in the image measurement device 100 of FIG. 1.

Steps S301 to S306 in FIG. 5 show a flowchart of one example of an operation during measurement in the image measurement device 100 of FIG. 1. The measurement process includes six procedures as described below. First, positioning of a workpiece is performed by imaging the workpiece placed on the movable stage 12 to obtain a workpiece image, and by analyzing the workpiece image based on the characteristic amount information of the measurement configuration data (step S301). The positioning of the workpiece is performed by detecting a position and a posture of the workpiece within the workpiece image using a technique such as a pattern matching technique based on the characteristic amount information.

Next, based on a result of the detection of the position and the posture and the measurement configuration data, the portion to be measured is specified (step S302), and an edge line in the workpiece image is detected (step S303). The size is measured by calculating a distance and an angle based on edge positions along the detected edge line for the corresponding portions to be measured and measurement type information of the measurement configuration data (step S304).

Then, an error is obtained based on a difference between the measured size value and the design value of the measurement configuration data, the error is compared with the tolerance corresponding to the error (step S305), and whereby pass-fail determination for each portion to be measured and for each workpiece is performed (step S306).

Workpiece Image

Figure 6A:
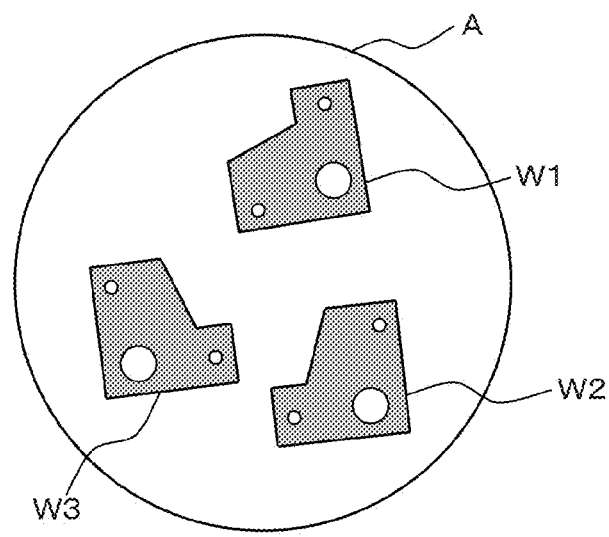
FIGS. 6A and 6B are views showing examples of the operation during measurement in the image measurement device 100 of FIG. 1, showing a workpiece image A including a plurality of workpieces W1 to W3 and a master image.
Figure 6B:
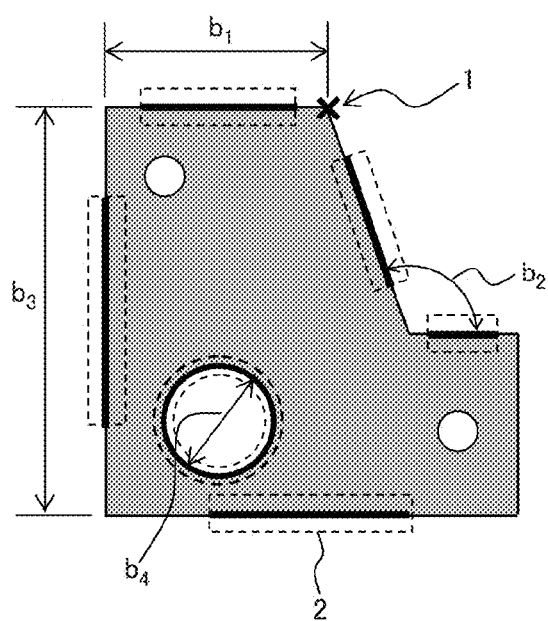

FIGS. 6A and 6B are views showing examples of an operation when measuring the workpiece in the image measurement device 100 of FIG. 1. FIG. 6A shows a workpiece image A obtained by imaging a plurality of workpieces W1 to W3 within a low-magnification visual field at a low magnification, and FIG. 6B shows the master image. The workpieces placed within the detection area 13 on the movable stage 12 can be captured in the low-magnification visual field. In the figure, the workpiece image A is imaged during the transmitted illumination.

In this example, the three workpieces W1 to W3 having the same shape and substantially the same size are placed within the low-magnification visual field. Each of the workpieces W1 to W3 is placed facing a random direction at a random position. Each of the workpieces W1 to W3 is configured by a thin flat component. The workpiece W2 is shown reversed in a state turning the workpieces W1 and W3 over.

The workpiece image A is displayed in a display screen 11a of the display 11 as needed, and it is possible to monitor the condition of the workpieces W1 to W3 in the low-magnification visual field on a real-time basis. Further, by analyzing the workpiece image A using the characteristic amounts obtained from the master image, it is possible to detect a placement state including the position and the posture of each of the workpieces W1 to W3 within the low-magnification visual field. The placement states of the workpieces W1 to W3 are used to specify the portions to be measured when measuring the sizes of the workpieces W1 to W3, respectively.

The master image is created based on a picked-up image of the predetermined reference object actually picked up by the image measurement device 100. Alternatively, it is possible to use a CAD image created by CAD as the master image.

In addition to the master image, the image measurement device 100 previously holds, as the measurement configuration data, various information such as information indicating an edge detection area 2 in which the edge line is detected, information for portions to be measured indicating the portions to be measured and the measurement type, design values $b_1$ to $b_4$ respectively for the portions to be measured, and tolerances associated with the design values $b_1$ to $b_4$.

The edge detection area 2 is, for example, a rectangular area surrounding a part of straight lines and circular arcs along a contour of the workpiece. Edge points are detected by analyzing brightness change in a predetermined direction in the edge detection area 2 within the workpiece image A. By fitting geometric figures such as straight lines and circular arcs over the edge points using a statistical method such as the method of least squares for the plurality of edge points that have been detected, it is possible to determine a contour line of the workpiece.

By specifying two parallel straight line portions along the contour of the workpiece as the portion to be measured, for example, a distance between these straight lines (the design value $b_3$) is measured as a size value. Further, by specifying a straight line portion and a characteristic point 1, a distance between the straight line and the characteristic point 1 (the design value $b_1$) is measured as a size value. Moreover, by specifying two straight line portions having different slopes, an angle between the straight lines (the design value $b_2$) is measured as a size value. Furthermore, by specifying a part (circular arc) or all of a circle as the portion to be measured, a diameter (the design value $b_4$), a radius, or a central coordinate of the circle is measured as a size value.

Hierarchical Display of Measurement Result

Figure 7:
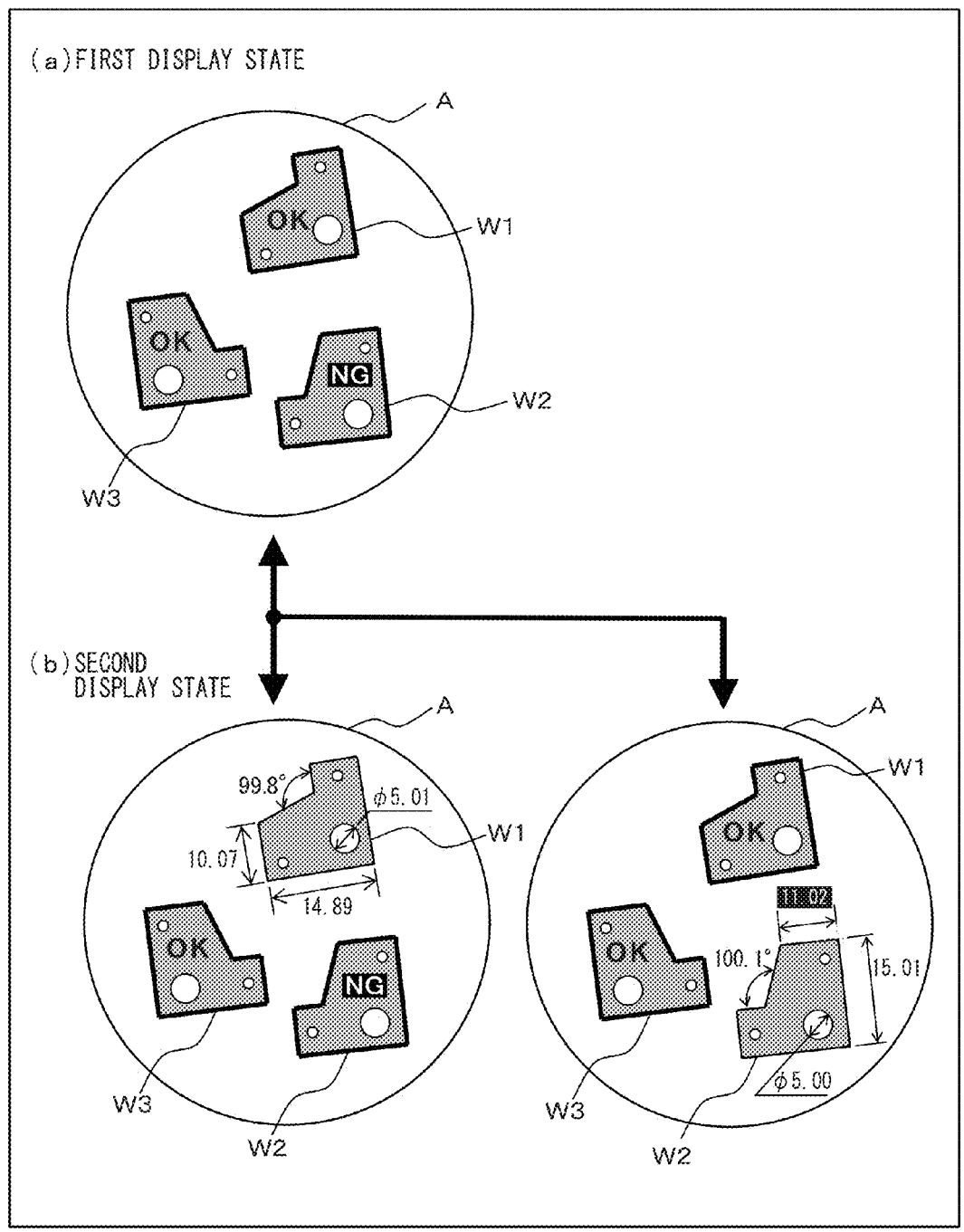
FIGS. 7A and 7B are views showing examples of an operation when displaying a measurement result in the image measurement device 100 of FIG. 1, each showing the workpiece image A indicating the measurement result.

FIGS. 7A and 7B are views showing examples of an operation when displaying a measurement result in the image measurement device 100 of FIG. 1, each showing the workpiece image A indicating the measurement result. FIG. 7A shows a first display state in which a result of the pass-fail determination is displayed for each of the plurality of workpieces W1 to W3 within the low-magnification visual field. Further, FIG. 7B shows a second display state in a case in which any of the workpieces W1 to W3 is selected.

Examples of the measurement result obtained by analyzing the workpiece image A include, in addition to the size values calculated for the respective portions to be measured, a result of the pass-fail determination of the size value at each portion to be measured and a result of the pass-fail determination of the workpiece. The pass-fail determination of the size value is performed by comparing the difference between the size value and the design value, that is, the error with the tolerance corresponding to this design value. Further, the pass-fail determination of the workpiece is performed based on the result of the pass-fail determination of the size values for the portions to be measured in the workpiece. For example, the workpiece is determined to be good when the errors at all of the portions to be measured are within a tolerance range, and the workpiece is determined to be defective when the error at any of the portions to be measured is out of the tolerance range.

The first display state is a display state in which pass or fail of the workpiece can be identified for each workpiece, and the result of the pass-fail determination is displayed over the workpiece image A. In this example, the workpieces W1 and W3 are workpieces in a good condition, and displayed with a green contour line and a green character string "OK" indicating that the workpieces are in a good condition. By contrast, the workpiece W2 is a defective workpiece, and displayed with a red contour line and a red character string "NG" indicating that the workpiece is defective.

If any of the workpieces is selected based on a predetermined operation by the user in the state in which the result of the pass-fail determination of the workpieces is displayed, the display is switched to the second display state. The second display state is a display state in which pass or fail of the size values for each portion to be measured, and the size values of the workpiece that has been selected in the first display state are displayed over the workpiece image A. In this case, the workpiece that has not been selected is displayed with the result of the pass-fail determination for this workpiece.

Specifically, if the workpiece W1 is selected, the size values calculated for the workpiece W1 are displayed in association with the portions to be measured, and the workpieces W2 and W3 that have not been selected are displayed with the result of the pass-fail determination for the corresponding workpieces. Further, if the workpiece W2 is selected, the size values calculated for the workpiece W2 are displayed in association with the portions to be measured, and the workpieces W3 and W1 that have not been selected are displayed with the result of the pass-fail determination for the corresponding workpieces.

In either case, the size values for four portions to be measured are displayed in association with the portions to be measured, respectively. In this example, each size value is displayed using a size line and size auxiliary lines (lead lines) indicating the portion to be measured.

The workpiece W2 is a defective workpiece, and one of the four portions to be measured indicated by the size value of "11.02" is a defective portion at which the error exceeds the tolerance range, and this size value is displayed in an identifiable manner from the other portions to be measured that are in a good condition. Here, the size value of "11.02" is displayed in a red character string, and the other size values are displayed in green character strings.

It should be noted that it is possible to employ a configuration, similarly to the first display state, in which the result of the pass-fail determination of the size value for each portion to be measured is displayed by the character string "OK" or "NG", instead of displaying the size value itself, in addition to the configuration in which a defective portion is displayed in an identifiable manner while the size values are displayed in association with the portions to be measured for the selected workpiece, as described above. In this case, if any of the portions to be measured is selected based on the predetermined operation in the state in which the result of the pass-fail determination of the size value for each portion to be measured is displayed by the character string, the size value is displayed for the selected portion to be measured.

Then, a predetermined cancellation operation performed in a state in which the result of the pass-fail determination of the size value is displayed for a specific workpiece can resume the first display state. Further, by performing a predetermined operation for changing a display target in the state in which the result of the pass-fail determination of the size value is displayed for the specific workpiece, it is possible to change the workpiece for which the result of the pass-fail determination of the size values for the portions to be measured are displayed.

Control Unit

Figure 8:
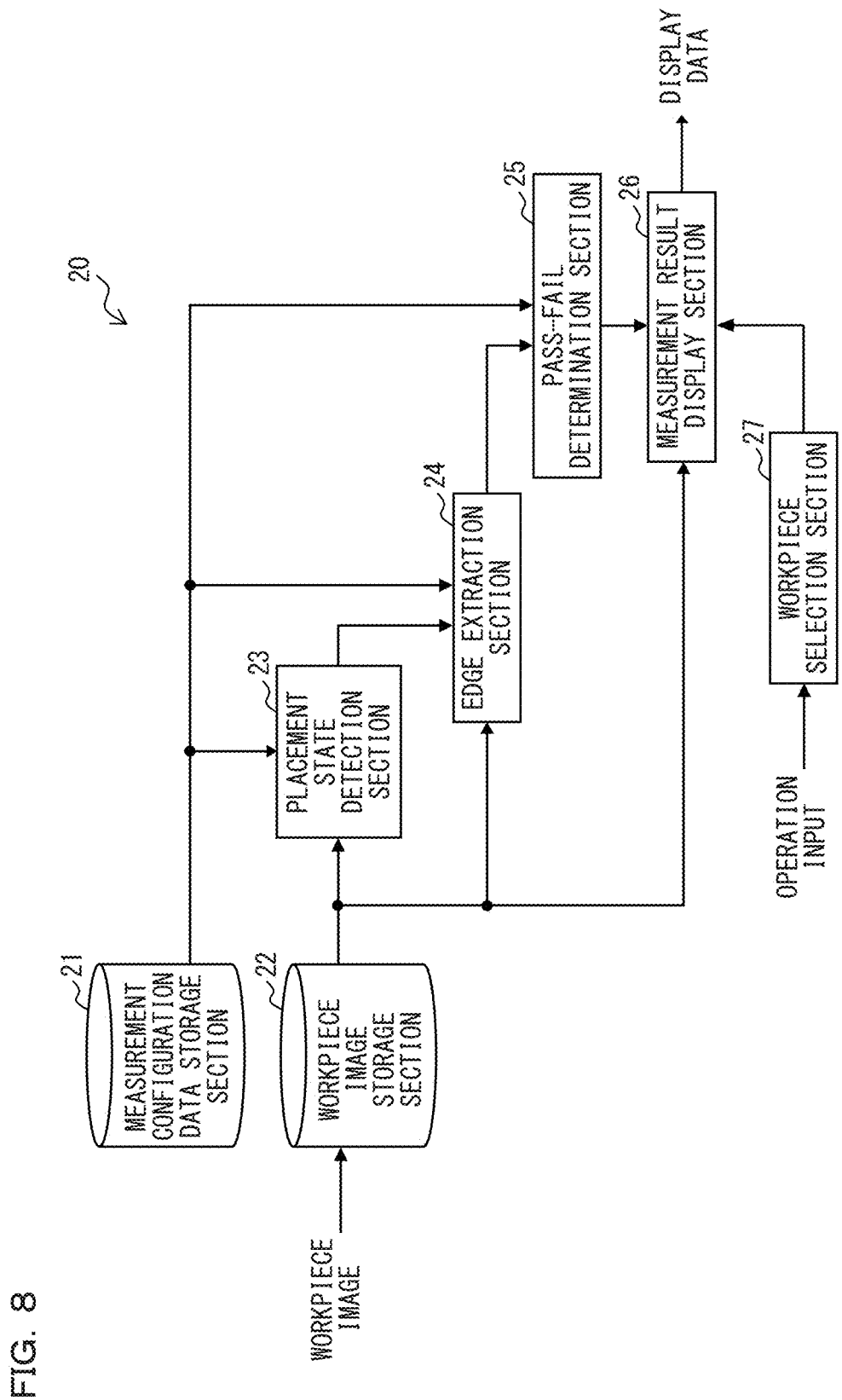
FIG. 8 is a block diagram showing an example of a configuration of a control unit 20 in the image measurement device 100 of FIG. 1, showing one example of a functional configuration within the control unit 20.

FIG. 8 is a block diagram showing an example of a configuration of the control unit 20 in the image measurement device 100 of FIG. 1, showing one example of a functional configuration within the control unit 20. The control unit 20 includes the measurement configuration data storage section 21, a workpiece image storage section 22, a placement state detection section 23, an edge detection section 24, a pass-fail determination section 25, a measurement result display section 26, and a workpiece selection section 27.

The measurement configuration data storage section 21 holds, as the measurement configuration data, various information such as the characteristic amount information indicating the characteristic amounts of the workpiece image A, the information for portions to be measured indicating the portions to be measured and the measurement type, and setting value information configured by the setting values (design values) set for the corresponding portions to be measured and the tolerances associated with the design values. The characteristic amount information is characteristic information for matching used for detecting the placement state such as the position and the posture of the workpiece within the workpiece image A, and includes a matching image for pattern matching, geometric information for geometric correlation search, and characteristic point information indicating the characteristic points of the workpiece.

The workpiece image storage section 22 holds the workpiece image A picked up by the measuring unit 10. The placement state detection section 23 detects the placement state of the workpiece based on the workpiece image A in the workpiece image storage section 22. Specifically, the position and the posture of the workpiece within the low-magnification visual field is detected by analyzing the workpiece image A using the characteristic amounts in the measurement configuration data storage section 21. The detection of the placement state is performed for all the workpieces within the low-magnification visual field.

The edge detection section 24 specifies a portion to be measured in the workpiece whose placement state has been detected by the placement state detection section 23 based on the placement state of this workpiece and the information for portions to be measured in the measurement configuration data storage section 21, and detects an edge line of the specified portion to be measured from the workpiece image A.

The pass-fail determination section 25 calculates the size value for each portion to be measured based on edge positions along the edge line detected by the edge detection section 24, and compares the difference between the size value and the setting value corresponding to this size value with the tolerance, thereby performing the pass-fail determination. The pass-fail determination of the size value is performed by determining whether or not the difference between the size value and the setting value (error) is within the tolerance range. Further, the pass-fail determination of the workpiece is performed based on the result of the pass-fail determination of the size value for each portion to be measured.

The measurement result display section 26 generates image data for displaying the result of the pass-fail determination for each workpiece over the workpiece image A, and outputs the generated data to the measuring unit 10. Specifically, when there are a plurality of workpieces that have been detected by the placement state detection section 23, the result of the pass-fail determination is displayed in the first display state in which the pass-fail for each detected workpiece can be identified.

The workpiece selection section 27 is a selection accepting unit configured to accept a selection of any of the displayed workpieces based on a predetermined input operation to specify one of the workpieces within the low-magnification visual field. Upon selection of the workpiece by the workpiece selection section 27, the measurement result display section 26 displays the size values in the second display state in which the pass-fail of the size value can be identified for each portion to be measured of the selected workpiece.

The result of the pass-fail determination of the size values is displayed by, for example, displaying the size values in association with the measurement sites in a manner identifiable between a portion in a good condition and a defective portion. By contrast, the workpiece that is not selected is displayed with the result of the pass-fail determination for this workpiece.

Display of Measurement Result

Figure 9:
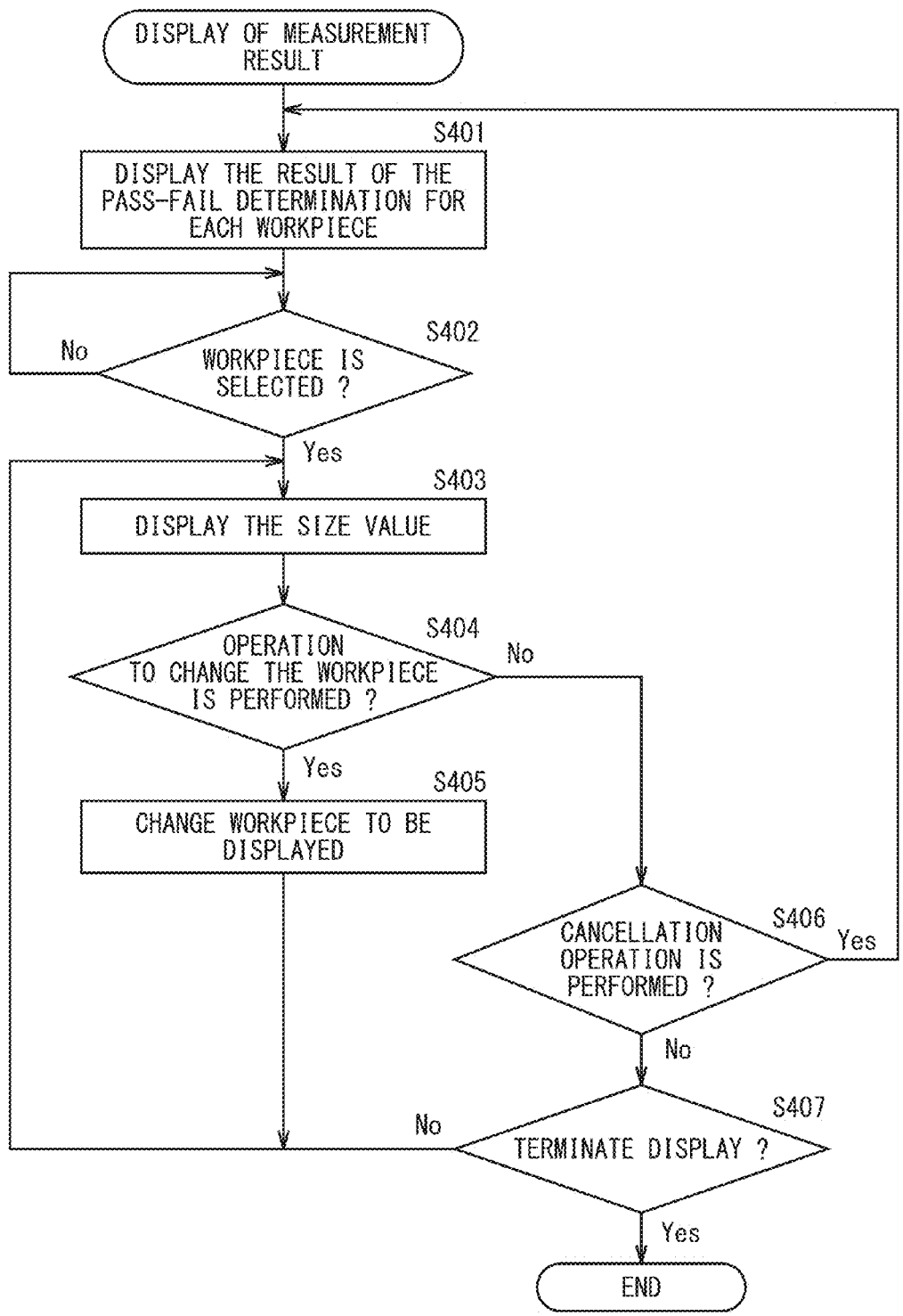
FIG. 9 is a flowchart of one example of the operation when displaying the measurement result in the image measurement device 100 of FIG. 1.

Steps S401 to S407 in FIG. 9 show a flowchart of one example of the operation when displaying the measurement result in the image measurement device 100 of FIG. 1. The measurement result display section 26 first displays the result of the pass-fail determination for each workpiece over the workpiece image A (step S401).

Next, when any of the workpieces in the workpiece image A is selected based on the user operation in the first display state, the measurement result display section 26 shifts the display to the second display state, and displays the size value for each portion to be measured of the selected workpiece in a display mode in which the pass or fail can be identified for each portion to be measured (steps S402 and S403). If an operation to change the workpiece is performed while the size values are displayed, the workpiece to be displayed is changed and the size values of the newly selected workpiece are displayed (steps S404 and S405).

By contrast, if a cancellation operation is performed while the size values are displayed, the first display state in which the result of the pass-fail determination for each workpiece is displayed is resumed, and the procedures of step S401 and after are repeated (step S406). The procedures from step S403 to step S406 are repeated until an instruction to terminate the display is made (step S407).

According to this embodiment, when the measurement result is displayed over the workpiece image A, the result of the pass-fail determination is displayed in the first display state in which the pass or fail of each workpiece can be identified. Therefore, as compared to the case in which the size value of each portion to be measured is displayed for each workpiece, it is possible, for the plurality of workpieces, to easily recognize relative positional relation and to easily identify the measurement result. Further, the size values of the selected workpiece are displayed in the second display state in which the pass or fail of the size value of each portion to be measured can be identified. Therefore, it is possible to identify the pass or fail for each workpiece, and to switch to the display state, for the desired workpiece, in which the pass or fail of each portion to be measured can be identified.

Second Embodiment

The first embodiment has described the case in which the result of the pass-fail determination for each workpiece is displayed in the first display state, and, when any of the workpieces is selected, the size values of the selected workpiece are displayed in the second display state in which the pass or fail of the size value can be identified for each portion to be measured. By contrast, this embodiment describes a case in which the portions to be measured of the workpiece are categorized into groups and the pass-fail determination is performed for each group including the plurality of portions to be measured.

Figure 10:
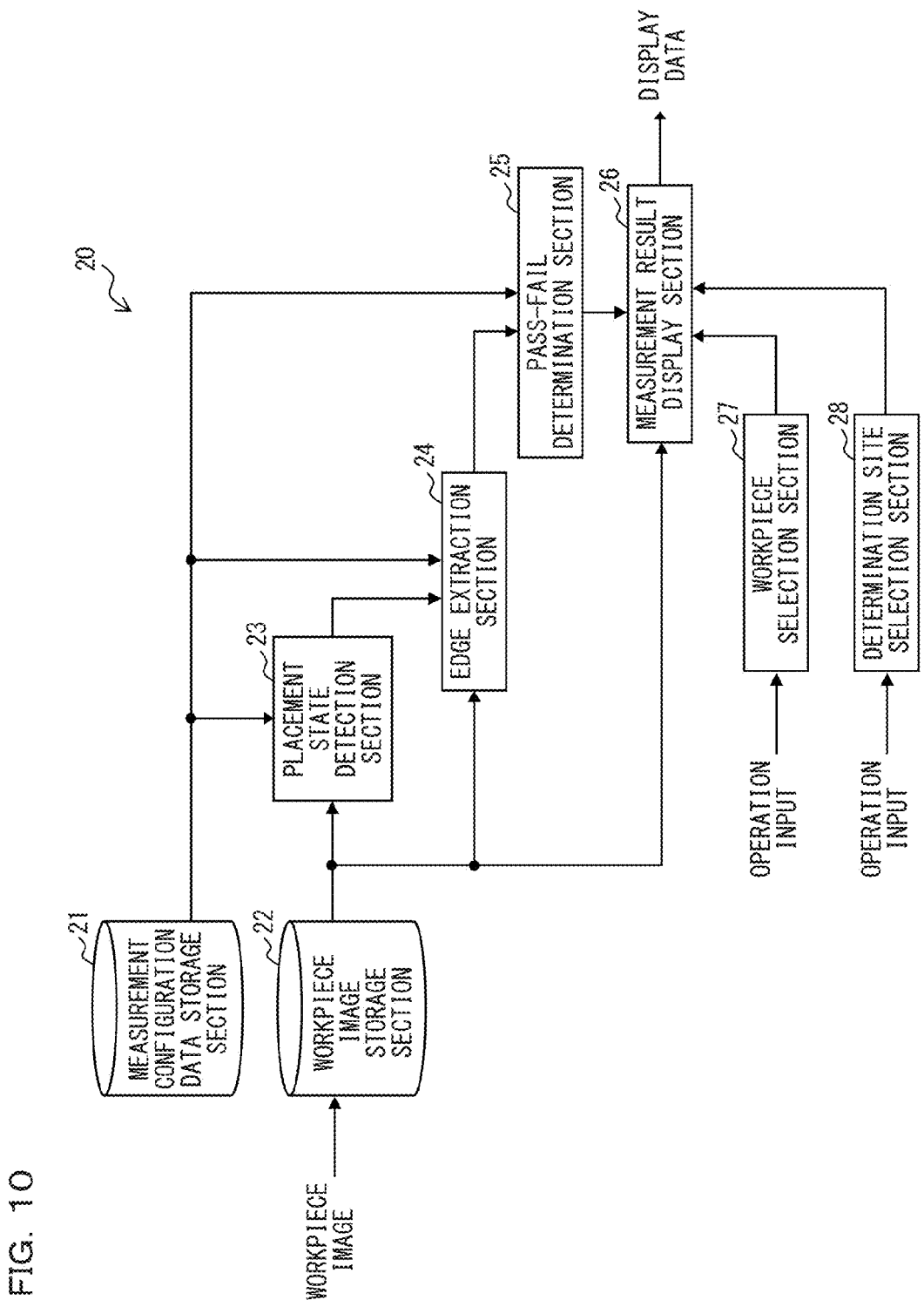
FIG. 10 is a block diagram showing an example of a configuration of the control unit 20 of the image measurement device 100 according to a second embodiment of the present invention.

FIG. 10 is a block diagram showing an example of a configuration of the control unit 20 of the image measurement device 100 according to the second embodiment of the present invention. The control unit 20 in this embodiment is different from the control unit 20 shown in FIG. 8 in that a determination site selection section 28 is provided.

The measurement configuration data storage section 21 holds, as the measurement configuration data, determination site information indicating a determination site including a plurality of portions to be measured. The determination site represents a single group when portions to be measured in a workpiece are categorized into groups, and includes a plurality of portions to be measured. When there are a plurality of portions having the same shape and substantially the same size within a workpiece, for example, each portion is previously specified as a determination site.

The placement state detection section 23 detects the placement state for each workpiece, and detects the placement state for each determination site based on the placement state of the corresponding detected workpiece and the determination site information of the measurement configuration data.

The pass-fail determination section 25 performs the pass-fail determination of the determination site based on the result of the pass-fail determination of the size value for each portion to be measured. For example, a determination site in which the errors for all the portions to be measured included in the determination site are within the tolerance range is determined to be in a good condition, and a determination site including a portion to be measured whose error is out of the tolerance range is determined to be defective.

The determination site selection section 28 selects any of the determination sites of the workpiece based on a predetermined input operation for selecting the determination site. When the workpiece selection section 27 selects any of the workpieces while the pass-fail determination for the workpieces is displayed in the first display state, the measurement result display section 26 displays the result of the pass-fail determination for the selected workpiece in the second display state in which the pass-fail can be identified for each determination site.

Then, when the determination site selection section 28 selects and specifies any of the determination sites in the second display state, the size values of the specified determination site are displayed in a third display state in which the pass-fail of the size value can be identified for each portion to be measured. By contrast, the determination site that is not specified is displayed with the result of the pass-fail determination for this determination site.

Characteristic Amount

Figure 11A:
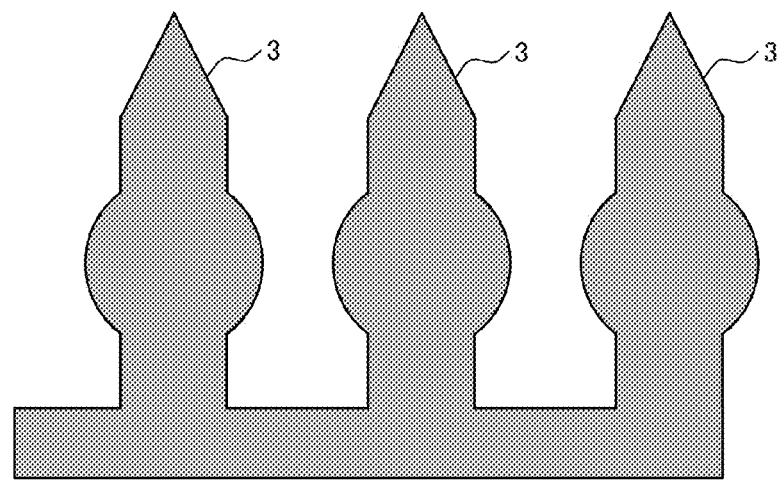
FIGS. 11A and 11B are views showing examples of an operation during measurement in the image measurement device 100 of FIG. 10, respectively showing characteristic amounts B1 and B2 used for detecting a position and a posture.
Figure 11B:
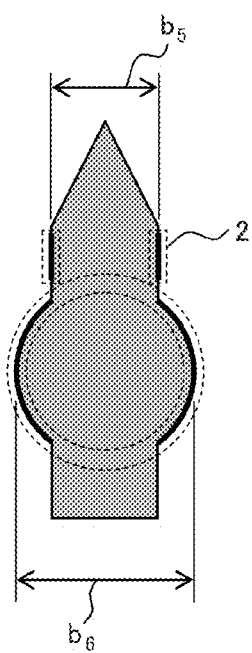

FIGS. 11A and 11B are views showing examples of the operation when measuring the workpiece in the image measurement device 100 of FIG. 10, respectively showing characteristic amounts B1 and B2 used for detecting the position and the posture. FIG. 11A illustrates the characteristic amount B1 showing an entire workpiece, and FIG. 11B illustrates the characteristic amount B2 showing a determination site within a workpiece.

The characteristic amount B1 is a pattern image to be compared with the workpiece image A in order to detect the placement state of the workpiece, and provided with three determination sites 3 having the same shape and substantially the same size. The characteristic amount B2 is a pattern image to be compared with the workpiece image A in order to detect the placement state of the determination site 3, and takes a shape that corresponds to the determination site 3 in the workpiece.

As the measurement configuration data, various information is previously held such as the information indicating the edge detection area 2 in which the edge line is detected, the information for portions to be measured indicating the portions to be measured and the measurement type, and the setting value information indicating setting values $b_5$ and $b_6$ for the respective portions to be measured and tolerances associated with the setting values $b_5$ and $b_6$.

Figure 12A:
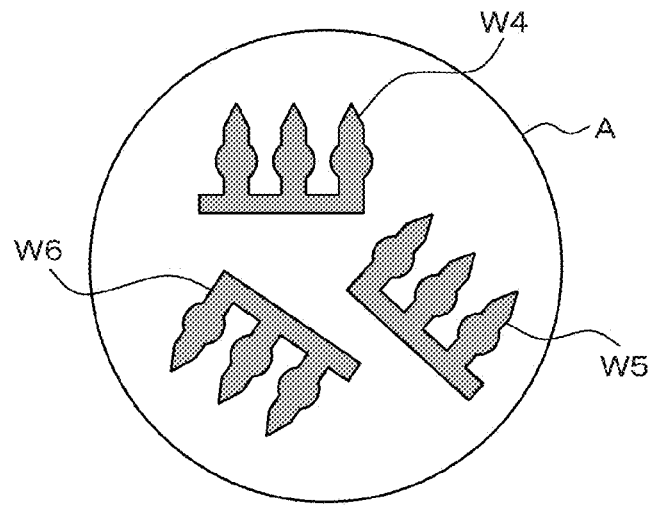
FIGS. 12A, 12B, and 12C are views showing examples of the operation during measurement in the image measurement device 100 of FIG. 10, each showing the workpiece image A including a plurality of workpieces W4 to W6.
Figure 12B:
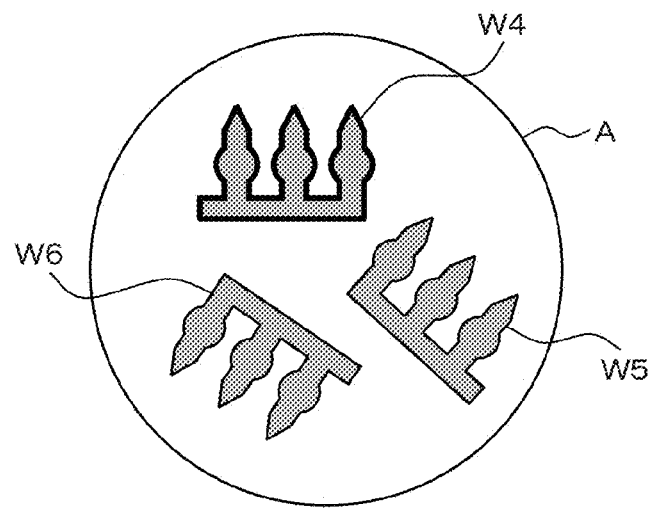
Figure 12C:
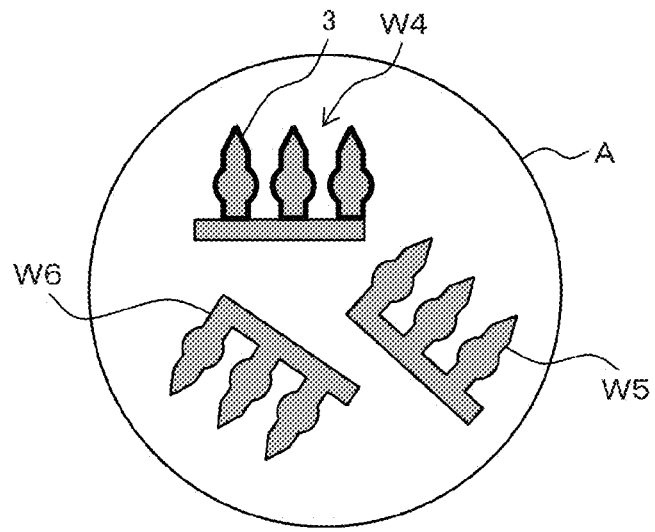

FIGS. 12A, 12B, and 12C are views showing examples of the operation when measuring the workpiece in the image measurement device 100 of FIG. 10, each showing the workpiece image A including a plurality of workpieces W4 to W6. FIG. 12A shows the workpiece image A obtained by imaging the three workpieces W4 to W6 within the low-magnification visual field at a low magnification. FIG. 12B shows how the position and the posture of each workpiece are detected. The workpiece W5 is shown reversed in a state turning the workpieces W4 and W6 over.

The workpiece image A is generated by imaging the plurality of workpieces W4 to W6 within the low-magnification visual field at a low magnification. By analyzing the workpiece image A using the characteristic amount B1, it is possible to detect the position and the posture for each of the three workpieces W4 to W6 within the low-magnification visual field.

FIG. 12C shows how the position and the posture of each determination site 3 in the workpiece W4 whose position and posture are detected are detected. By analyzing the workpiece image A using the characteristic amount B2, it is possible to detect the position and the posture for each of the three determination sites 3 of the workpiece W4.

Hierarchical Display of Measurement Result

Figure 13A:
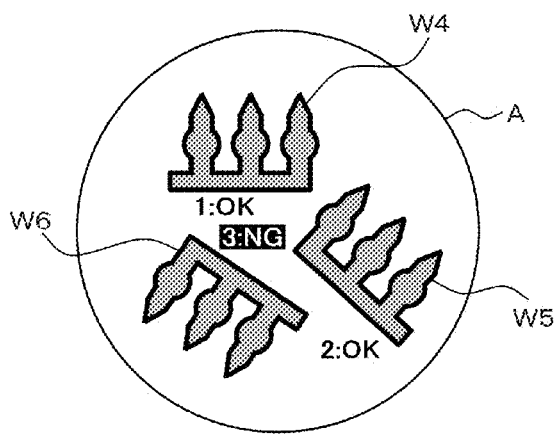
FIGS. 13A, 13B, and 13C are views showing examples of an operation when displaying a measurement result in the image measurement device 100 of FIG. 10, each showing the workpiece image A indicating the measurement result.
Figure 13B:
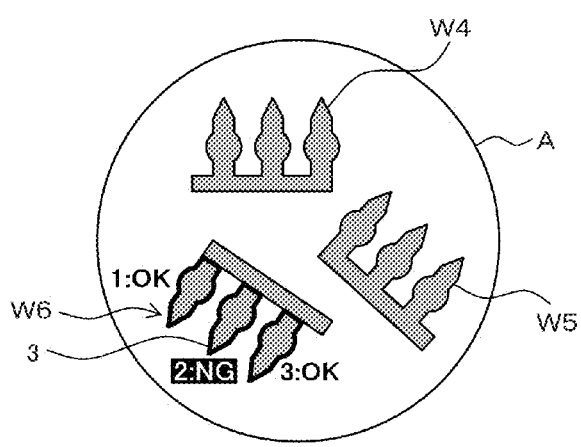
Figure 13C:
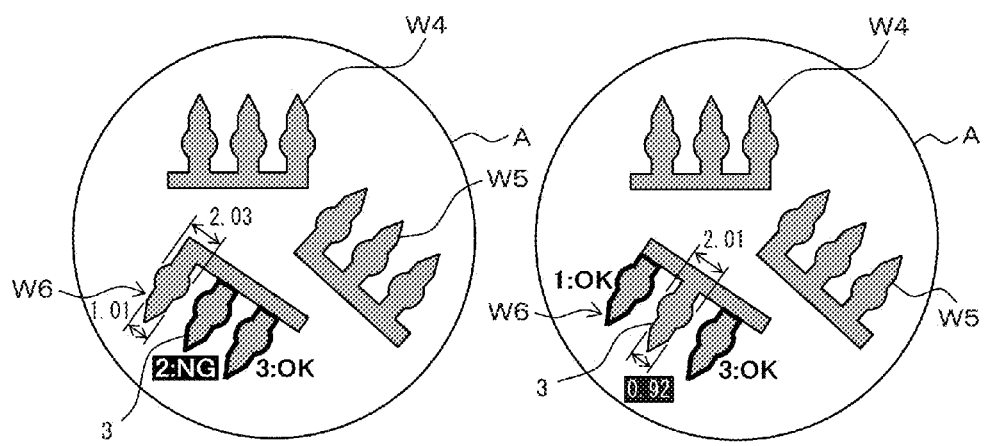

FIGS. 13A, 13B, and 13C are views showing examples of the operation when displaying the measurement result in the image measurement device 100 of FIG. 10, each showing the workpiece image A indicating the measurement result. FIG. 13A shows the plurality of workpieces W4 to W6 within the low-magnification visual field in the first display state in which the pass or fail can be identified for each workpiece.

In the first display state, the result of the pass-fail determination for each workpiece is displayed for the plurality of workpieces W4 to W6 within the low-magnification visual field. In this example, the workpieces W4 and W5 are workpieces in a good condition, and displayed with a green contour line and a green character string "OK" indicating that the workpieces are in a good condition.

By contrast, the workpiece W6 is a defective workpiece, and displayed with a red contour line and a red character string "NG" indicating that the workpiece is defective. If any of the workpieces is selected based on a predetermined operation by the user in the first display state in which the result of the pass-fail determination is displayed for each workpiece as described above, the display is switched to the second display state.

FIG. 13B illustrates the workpiece W6 that has been selected by the user in the first display state shown in the second display state in which the pass or fail can be identified for each determination site 3. In the second display state, the result of the pass-fail determination for each determination site 3 in the selected workpiece W6 is displayed. In this example, the determination sites represented by "1" and "3" are sites in a good condition, and displayed with a green contour line and a green character string "OK" indicating that the sites are in a good condition.

By contrast, the determination site represented by "2" is a defective site, and displayed with a red contour line and a red character string "NG" indicating that the site is defective. If any of the determination sites 3 is selected based on a predetermined operation by the user in the second display state in which the result of the pass-fail determination for each determination site 3 is displayed as described above, the display is switched to the third display state.

FIG. 13C illustrates the determination site 3 selected by the user in the second display state shown in the third display state in which the pass or fail of the size value can be identified for each portion to be measured. In the third display state, the size values are displayed in a display mode in which the pass or fail can be identified for each portion to be measured for the selected determination site 3. In this case, the determination site 3 that is not selected is displayed with the result of the pass-fail determination for this determination site 3.

If the determination site represented by "1" is selected in the second display state, for example, the size values are displayed in association with the portions to be measured of the determination site represented by "1". Further, if the determination site represented by "2" is selected in the second display state, the size values are displayed in association with the portions to be measured of the determination site represented by "2".

The determination site represented by "2" is a defective site, and one of the two portions to be measured indicated by the size value of "0.92" is a defective portion at which the error exceeds the tolerance range, and displayed in a manner identifiable from the other portions to be measured that are in a good condition. Here, the size value of "0.92" is displayed in a red character string, and the other size values are displayed in green character strings.

According to this embodiment, it is possible to switch to the display state, for the desired workpiece, in which the pass or fail can be identified for each determination site 3. Further, for the desired one of the determination sites 3, it is possible to confirm the size values in the display state in which the pass or fail of the size value can be identified for each portion to be measured.

REFERENCE SIGNS LIST

1 Characteristic point
2 Edge detection area
3 Determination site
10 Measuring unit
11 Display
11a Display screen
12 Movable stage
13 Detection area
14a XY position adjustment knob
14b Z position adjustment knob
15 Power switch
16 Measurement start switch
20 Control unit
21 Measurement configuration data storage section
22 Workpiece image storage section
23 Placement state detection section
24 Edge detection section
25 Pass-fail determination section
26 Measurement result display section
27 Workpiece selection section
28 Determination site selection section
31 Keyboard
32 Mouse
40 Casing
41 Z drive section
42 XY drive section
43, 44 Imaging device
50 Transmitted illumination unit
51 Transmitting illumination light source
52 Mirror
53 Optical lens
60 Ring illumination unit
71 Coaxial epi-illumination light source
72 Half mirror
80 Receiver lens unit
81, 84, 86 Receiver lens
82 Half mirror
83, 85 Throttle plate
100 Image measurement device
A Workpiece image
B1, B2 Characteristic amount
W1 to W6 Workpiece

What is claimed is:

1. An image measurement device for measuring sizes of each workpiece in a workpiece image including a plurality of workpieces having the same shape and about the same size by detecting edges therein, the image measurement device comprising a measuring unit and a control unit;

said control unit having a measurement configuration data storage section for storing characteristic amount information indicating characteristic amounts for detecting the plurality of workpieces from the workpiece image, information for portions to be measured, and setting value information including a design data and tolerances in association with the portions to be measured;

said control unit having a placement state detection section for detecting positions and postures of the plurality of workpieces by analyzing the workpiece image using the characteristic amounts;

said control unit having an edge detection section for detecting edges of the portions to be measured from the workpiece image for the workpieces of which the positions and the postures are detected;

said control unit having a pass-fail determination section for calculating the sizes of the portions to be measured based on the detected edges, comparing differences between the sizes and the design data with the tolerances, performing a pass-fail determination of the portions measured, and performing a pass-fail determination of the workpieces based on the pass-fail determination of the portions measured, wherein the workpiece is determined to be good when the differences at all of the portions measured are within a tolerance range, and the workpiece is determined to be defective when the differences at any of the portions measured is out of the tolerance range;

a measurement result display section for displaying results of the pass-fail determination of the workpieces over the workpiece image, wherein the result of pass-fail determination is displayed in a first display state in which the pass-fail for each detected workpiece is identified; and said control unit having a workpiece selection section for selecting any of the workpieces, wherein the measurement result display section shifts to a second display state when any of the workpieces in the workpiece image is selected by the workpiece selection section in the first display state, and displays the result of the pass-fail determination of the portions measured for the workpiece selected by the workpiece selection section.

2. An image measurement device for measuring sizes of each workpiece in a workpiece image including a plurality of workpieces having the same shape and about the same size by detecting edges therein, the image measurement device comprising a measuring unit and a control unit;

said control unit having a measurement configuration data storage section for storing characteristic amount information including first characteristic amounts for detecting the plurality of workpieces from the workpiece image and second characteristic amounts for detecting a determination site including two or more portions to be measured, information for portions to be measured, setting value information including a design data and tolerances in association with the portions to be measured, and determination site information indicating the determination site;

said control unit having a placement state detection section for detecting positions and postures of the plurality of workpieces by analyzing the workpiece image using the first characteristic amounts and positions and postures of the determination site using the second characteristic amounts;

said control unit having an edge detection section for detecting edges of the portions to be measured from the workpiece image for the workpieces of which the positions and the postures are detected;

said control unit having a pass-fail determination section for calculating the sizes of the portions to be measured based on the detected edges, comparing differences between the sizes and the design data with the tolerances, performing a pass-fail determination of the portions measured, and performing a pass-fail determination of the determination site and the workpieces based on the pass-fail determination of the portions measured, wherein the workpiece is determined to be good when the differences at all of the portions measured are within a tolerance range, and the workpiece is determined to be defective when the differences at any of the portions measured is out of the tolerance range;

a measurement result display section for displaying results of the pass-fail determination of the workpieces over the workpiece image, wherein the result of pass-fail determination is displayed in a first display state in which the pass-fail for each detected workpiece is identified; and said control unit having a workpiece selection section for selecting any of the workpieces, wherein the measurement result display section shifts to a second display state when any of the workpieces in the workpiece image is selected by the workpiece selection section in the first display state, and displays the result of the pass-fail determination of the determination site for the workpiece selected by the workpiece selection section.

3. The image measurement device according to claim 2, further comprising;

a determination site selection section in said control unit for selecting the determination site of the workpiece selected by the workpiece selection section, wherein the measurement result display section shifts to a third display state if any of the determination site is selected in the second display state, and displays the result of the pass-fail determination of the portions measured for the determination site selected by the determination site selection section.

4. The image measurement device according to claim 1, wherein the measurement result display section displays the size in association with the portions measured.

5. An image measurement method for measuring sizes of each workpiece in a workpiece image including a plurality of workpieces having the same shape and about the same size by detecting edges therein, the image measurement method comprising;

storing characteristic amount information indicating characteristic amounts for detecting the plurality of workpieces from the workpiece image, information for portions to be measured, and setting value information including a design data and tolerances in association with the portions to be measured;

detecting positions and postures of the plurality of workpieces by analyzing the workpiece image using the characteristic amounts;

detecting edges of the portions to be measured from the workpiece image for the workpieces of which the positions and the postures are detected;

calculating the sizes of the portions to be measured based on the detected edges, comparing differences between the sizes and the design data with the tolerances and performing a pass-fail determination of the portions measured;

performing a pass-fail determination of the workpieces based on the pass-fail determination of the portions measured, wherein the workpiece is determined to be good when the differences at all of the portions measured are within a tolerance range, and the workpiece is determined to be defective when the differences at any of the portions measured is out of the tolerance range; and displaying results of the pass-fail determination of the workpieces over the workpiece image, wherein the pass-fail determination of the portions measured for the selected workpiece is displayed when any of the workpieces is selected.

6. A non-transitory computer readable medium storing a program for an image measurement device for measuring sizes of each workpiece in a workpiece image including a plurality of workpieces having the same shape and about the same size by detecting edges therein, the program comprising;

storing characteristic amount information indicating characteristic amounts for detecting the plurality of workpieces from the workpiece image, information for portions to be measured, and setting value information including a design data and tolerances in association with the portions to be measured;

detecting positions and postures of the plurality of workpieces by analyzing the workpiece image using the characteristic amounts;

detecting edges of the portions to be measured from the workpiece image for the workpieces of which the positions and the postures are detected;

calculating the sizes of the portions to be measured based on the detected edges, comparing the differences between sizes and the design data with the tolerances and performing a pass-fail determination of the portions measured;

performing a pass-fail determination of the workpieces based on the pass-fail determination of the portions measured, wherein the workpiece is determined to be good when the differences at all of the portions measured are within a tolerance range, and the workpiece is determined to be defective when the differences at any of the portions measured is out of the tolerance range; and displaying results of the pass-fail determination of the workpieces over the workpiece image, wherein the pass-fail determination of the portions measured for the selected workpiece is displayed when any of the workpieces is selected.

* * * * *